United States Patent [19]

Nishi et al.

[11] Patent Number: 4,536,471

[45] Date of Patent: Aug. 20, 1985

[54] OPTICAL INFORMATION RECORDING MEDIUM

[75] Inventors: Shinichi Nishi, Hino; Taxey Satoh, Hachioji; Fumio Shimada, Hamura; Toshiaki Takahashi, Musashimurayama, all of Japan

[73] Assignee: Konishiroku Photo Industry Co., Ltd., Tokyo, Japan

[21] Appl. No.: 590,000

[22] Filed: Mar. 15, 1984

[30] Foreign Application Priority Data

Mar. 16, 1983 [JP] Japan .................................. 58-42202

[51] Int. Cl.$^3$ ............................................... G03C 1/00
[52] U.S. Cl. ..................................... 430/495; 430/270; 430/321; 430/616; 430/945; 346/135.1
[58] Field of Search ............... 430/495, 321, 616, 945, 430/270; 346/76 L, 135.1; 369/13, 112, 125, 275

[56] References Cited

FOREIGN PATENT DOCUMENTS 56-56839  4/1982  Japan .

Primary Examiner—Mary F. Downey
Attorney, Agent, or Firm—Finnegan, Henderson, Farabow, Garrett & Dunner

[57] ABSTRACT

An optical information recording medium for recording and reproducing information by way of applying high density energy beams to a reflective recording layer on a support, said recording layer comprising a hydrophilic colloid; a compound capable of producing a water-insoluble copper complex; and reflective fine particles consisting essentially of copper. A process for manufacturing said optical information recording medium is also provided.

16 Claims, 5 Drawing Figures

OPTICAL INFORMATION RECORDING MEDIUM

BACKGROUND OF THE INVENTION

1. Technical Field of the Invention

This invention relates to an optical information recording medium for writing or reading an information upon irradiating a high energy flux density beam such as a laser beam and, more particularly, to an optical information recording medium comprising a recording layer mainly made of fine copper particles dispersed in a hydrophilic colloid.

2. Description of the Prior Art

There have so far been known the recording layers comprising various types of compositions, in the optical information recording media usable in such a manner that an information such as a sound, image, or the like is optically recorded according to the variations of the configuration, dimensions or the like of a pit or block, or that an information is optically picked up and is then converted into a sound signal or an image signal so as to reproduce it. They may include, as one of the examples thereof, a thin film recording layer comprising a metalloid such as tellurium, bismuth, selenium or the like and the oxides thereof (Yamashita et al., The 28th Applied Physics Lecture Proceedings, 1981, p. 141) and a chalcogen compound such as selenium-tellurium-arsenic (M. Terace et al., P. Appl. Phys. No. 50, 1979, p. 6881), tellurim-arsenic or the like. They can, however, hardly be mass-produced continually, because a vacuum equipment has to be used in a manufacturing process, and they are disadvantageous because a relative reproduction error of a recorded information is increased by the deterioration, such as oxidation of the compounds being contained in a recording layer, and there are many toxic compounds among the compounds used, so that the safety thereof is not reliable.

Optical information recording media capable of solving these disadvantages include, as disclosed in Japanese Patent Publication Open to Public Inspection (hereinafter called Japanese Patent O.P.I. Publication) Nos. 12425/1982, 24290/1982 and 39989/1982, those having a recording layer comprising a binder into which a metal is dispersed in the form of fine particles of not larger than 50 nm in the average size. This type of recording media each have a recording layer comprising black fine particles dispersed therein, and are used for recording upon increasing the reflectivity of the recording layer by irradiating it with laser beams. Accordingly, as compared with another type of recording media being used for recording by lowering the reflectivity of the recording layer, they have a disadvantage that a tracking signal is hardly obtained.

Recording media being used in the systems in which a recording is carried out by lowering the reflectivity of the recording layer thereof further include, for example, that disclosed in Japanese Patent O.P.I. Publication No. 10491/1981. This medium has a recording layer containing a binder comprising a polymer in which fine particles of a metal or the oxide thereof are dispersed; and the particle size of the metal or the oxide thereof is 20 to 150Å. This medium is, however, manufactured by making use of a toxic organic solvent to form fine particles from a metal carbonyl as an initial raw-material. It is, therefore, disadvantageous in that not only the manufacturing environment will cause a problem, but also the fine particles will be unstable and rapidly oxidized and the recording layer will become uneven in the direction of thickness. In addition, the binder, which is a dispersion medium for the fine particles of a metal or the oxide thereof, is a lipophilic polymer, therefore, the so-called aqueous coating is not possible and the manufacturing environment becomes undesired from the viewpoint of health conditions. Further, the reflectivity of this recording medium is as low as not higher than 30%, therefore, it is not suitable for a reflecting light reading type optical information recording medium.

Recording media being used by lowering the reflectivity of the recording layer thereof include, for example, those disclosed in Japanese Patent O.P.I. Publication Nos. 108995/1980, 33995/1981, 49296/1981 and 49297/1981. This type of recording media comprises a support bearing thereon a silver halide emulsion layer and a recording layer of which the reflective silver particles are deposited, by a photographic chemical development and physical development, in the neighborhood of the surface of the silver halide emulsion layer. These media may be regarded as the highly sensitive optical information recording media from the viewpoint of that they contain a thermally insulating gelatin superior to silver. In these recording media, however, the recording layer thereof is 3 to 6 $\mu$m in thickness, therefore not only the sensitivity has its limit but also the silver density has its gradient distribution in the direction of thickness, and only the neighborhood of the recording layer surface becomes highly reflective. Accordingly, this type of recording media is hardly applied to the systems in which a recording or reproducing is carried out through a support.

On the other hand, in the publication having disclosed the above-mentioned prior art, there are only the descriptions mainly of such a recording medium of which the surface of the recording layer provided onto the support is made reflective. These media each are required to be provided with such a protective layer as a silicon oxide layer or a polymethylmethacrylate layer, or the whole of the recording medium is encapsulated so that the pits on the recording layer's surface may be protected against dusts. Accordingly, a protective layer coating process, a medium encapsulating process or the like is required.

To avoid such a trouble as described above, a recording medium having a transparent support made of polymethylmethacrylate, glass-plate or the like is ordinarily used to record therethrough and in this case, it has been known that transparent supports each are superposed on the both sides of the recording medium.

The inventors have attained this invention by finding out the facts that an optical information recording medium having a recording layer comprising a hydrophilic colloid containing fine particles consisting essentially of copper is very inexpensive in cost as compared with those using silver, gold, palladium, cobalt, nickel or the like; and it is preferred from the viewpoint of health condition in a working environment because it is less toxic enough as compared with those using mercury or lead; and, in addition, it is high in sensitivity and excellent in stability.

As the recording materials in which copper is utilized, there have so far been known those each having a light-sensitive image-forming emulsion layer comprising particles of a cuprous halide dispersed in a macromolecular substance. For example, there have been disclosed, in the literature, Poznan Towarz Przyjacio Nauk. Prace Komisji Mat. Przyrod, 7, p. 23, 1956, an emulsion layer comprising the pulverized crystals of CuCl dispersed in an aqueous gelatin solution of 10% concentration, and in West German Pat. No. 950428 an emulsion layer comprising cuprous bromide produced through a reaction of cupric bromide ($CuBr_2$) with sulfurous acid gas ($SO_2$) or hydrogen sulfide ($H_2S$) and dispersed in polyvinyl alcohol. These emulsion layers are effective, in general, as a light-sensitive photographic element, however, they may not be put in practical use as an element of an optical information recording medium because they have a problem of the graininess thereof after a development. To be more concrete, the developed copper particles thereof are large in size and the distribution of the dispersed particles is uneven, and noises are thereby caused very seriously.

SUMMARY OF THE INVENTION

Objects of the invention

It is an object of the invention to provide an optical information recording medium having a recording layer which is great in the absorptivity and the reflectivity to a recording beam and a reproducing beam emitted through a support, and which is excellent in homogeneity and stability.

Another object of the invention is to provide an optical information recording medium in which a recording layer can be obtained by the so-called aqueous coating, the cost is inexpensive, the toxicity is relatively less, the working environmental safety is high in the manufacturing process, and any environmental pollution will not be brought on.

The above-mentioned objects of the invention can be achieved by an optical information recording medium carrying out the recording and the reproducing of an information by making use of a high energy flux density beam, the optical information recording medium having a reflective recording layer comprising a hydrophilic colloid containing reflective fine particles consisting essentially of copper.

DETAILED DESCRIPTION OF THE INVENTION

In this invention, an optical information recording medium is constituted by providing onto a transparent support with a reflective recording layer comprising a hydrophilic colloid containing reflective fine particles consisting essentially of copper.

In a preferred embodiment of this invention, the thickness of the recording layer is from 0.01 to 0.5 $\mu$m, the average size of the fine copper particles is from 0.005 to 0.2 $\mu$m, the recording layer is a layer obtained by physical development of a physical developing nuclei containing layer, the support is substantially transparent to a high energy flux density beam, and the medium is used in such a system that a recording or a reproducing is made through the support. The distribution density of the fine copper particle number is preferably from $1 \times 10^{15}$ to $1 \times 10^{18}$ peices/cm$^3$. By regulating the distribution density of the particle number, the absorptivity of a recording beam in the recording layer is improved, the reflectivity is improved in the neighborhood of the interface between the support and the recording layer, the reflection unevenness therein is reduced, the sensitivity and the S/N ratio is increased, and a recording medium which is excellent in homogeneity and stability can be obtained.

In this invention, when a recording layer is made reflective by applying a physical development process to a physical developing nuclei containing layer coated over a support, the average size of fine copper particles held in the physical developing nuclei containing layer containing a hydrophilic colloid is enlarged through the physical development process with keeping the fine copper particle number constant. It is, therefore, possible to readily manufacture a recording layer excellent in homogeneous dispersibility. When using a physically developed recording layer, it is possible to obtain a recording layer comprising fine copper particles dispersed therein having a suitable distribution density of the particle number, if the distribution density of physical developing nuclei in a physical developing nuclei containing layer, the thickness of the physical developing nuclei containing layer, and the conditions and requirements of the physical development are regulated. The distribution density of such fine copper particles can readily be calculated, with an electron microscope, for example, by measuring the thickness of the recording layer of a recording medium obtained, the amount of copper in the recording layer, and the average size of the fine copper particles.

This invention will be more detailedly described hereafter in connection with the accompanying drawings.

Figure 1:
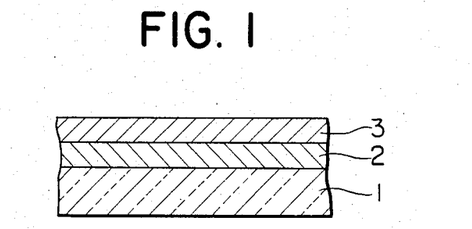
FIG. 1 is a cross-sectional view of an optical information recording medium precursor which is not yet physically developed.

FIG. 1 is a cross-sectional view showing an example of the embodiment of an optical information recording medium precursor, i.e., the medium not yet physically developed, relating to the invention. 1 is a support, 2 is a layer containing physical developing nuclei comprising hydrophilic colloid dispersion media in which the physical developing nuclei are dispersed, and 3 is a copper compound dispersed layer laminated on the layer 2 containing the physical developing nuclei.

As for the materials of the supports, any support may be used in this invention, provided that such a support is substantially transparent to a high energy flux density beam. The examples thereof include, those made of cellulose triacetate, polyethylene terephthalate, polymethylmethacrylate, polycarbonate, ceramics, polyimide resins, glass plates, a metal, or the like. These supports are preferably sublayered. The subbing agents to be used in this case include, for example, a silane coupling agent, a silicate and a titanium coupling agent, and, more preferably, a silane coupling agent described in U.S. Pat. No. 3,661,584.

A surface treatment such as a corona-discharge, a prasma-discharge, an ion-bombardment or the like can be applied to a spport, for improving the adhesive property to the support. A support having a guide groove, i.e., a fine relief-like guide, for determining correctly a recording or reproducing position can also be used.

As for the material for the physical developing nuclei for forming the described physical developing nucleus containing layers, and well-known physical developing nuclei may be used in this invention.

For example, a heavy metal sulfide such as those of zinc, chromium, potassium, iron, cadmium, cobalt, nickel, lead, antimony, bismuth, silver, cerium, arsenic, copper, or rhodium or a heavy metal selenide such as those of lead, zinc, antimony, or nickel can be used.

Another useful materials for the physical developing nuclei include a noble metal such as silver, gold, platinum, copper, palladium or mercury.

They are preferably present in the form of colloid particles in a hydrophilic colloid. Such metallic salts as given above and preferably such a simple inorganic, readily reducible salt as silver nitrate, gold chloride, and gold nitrate, are useful for the physical developing nuclei.

Another useful physical developing nuclei includes a thio compound such as silver thioxalate, the lead or nickel complex salts thereof, thioacetamide or the like.

In this invention, the various kinds of heavy metals, noble metals, the sulfides thereof, selenides and the like may also be provided, as a physical developing nucleus, onto a support by applying a process such as an evaporation deposition process, a spattering process, a chemical vapor phase growth process or the like. A layer containing the described physical developing nuclei may be extremely thinned in thickness in such a process as the evaporation deposition process, the spattering process, the chemical vapor phase growth process or the like, and it is accordingly advantageous to effectively utilize the energy of a recording beam. In this case, the thickness of the layer is 5 to 1000 Å and preferably 20° to 500 Å. The preferred physical developing nucleus materials include a heavy metal sulfide such as those of zinc, cadmium, silver, lead or the like, and a metal such as silver, gold palladium, copper or the like.

The size of fine particles for forming the described physical developing nuclei must be fine enough to perform an effective physical development. The size thereof is therefore from 0.002 to 0.2 $\mu$m and preferably from 0.01 to 0.05 $\mu$m.

Any one of the desired processes may be applied to provide the described physical developing nuclei containing layer on a support. For example, (1) A physical developing nuclei containing layer is prepared by coating onto a support with a solution in which the described physical developing nucleus materials are dispersed in a hydrophilic colloid dispersion medium; (2) A thin film of the described physical developing nucleus material is formed on a support in an evaporation deposition process or a spattering process, and then a physical developing nuclei containing layer is prepared by over-coating a hydrophilic colloid dispersion medium; and (3) A hydrophilic colloid dispersion medium is coated onto a support and then a thin film of physical developing nuclei material is formed in an evaporation deposition process or a spattering process so as to prepare a physical developing nuclei containing layer. The preferable one is the above-mentioned process (1) or (2). In place of the described evaporation deposition process and the spattering process, a chemical vapor phase growth process or a liguid phase formation process may also be used. Any desired coating method may be adopted in this case, such as a blade-coating method, an air-knife coating method, a bar coating method, a roll coating method, a curtain coating method, a spinner coating method and the like. The thickness of the physical developing nuclei containing layer thus prepared is of the order of 0.01 to 0.5 $\mu$m and preferably from 0.01 to 0.1 $\mu$m.

The colloid dispersion media for forming a layer containing physical developing nuclei include a hydrophilic colloid in which physical developing nuclei are able to be present stably and evenly in the form of the colloidal particles. The example thereof include gelatin, an alkali-treated gelatin, an acid-treated gelatin and a gelatin derivative; a colloidal albumin; casein; a cellulose derivative, e.g., carboxymethyl cellulose, hydroxyethyl cellulose and the like; a sugar derivative, e.g., sodium alginate, a starch derivative and the like; a synthetic hydrophilic macromolecule, e.g., a poly-N-vinylprolidone and a polyacrylic acid copolymer; polyvinyl alcohol derivatives and the like. These may also be used in combination with two or more kinds each if occasion demands. Among these colloid dispersion media, the preferable one is a low thermal conductive hydrophilic colloid, and the desired monomer units are an acrylic acid resin composed of a copolymer containing at least an acrylate or a methacrylate, a water-soluble cellulose derivative and gelatin. In contrast with the above, a hydrophobic macromolecular material may not be used because the protective colloidal property is weak, and the physical development accompanying with a copper ion dispersion is distrubed in progress.

As a copper compound to be used in the copper compound containing layer for supplying copper atoms to the physical developing nuclei of the physical developing nuclei containing layer by a physical development, there may be used a cuprous halide such as $CuCl$, $CuBr$, $CuI$ and the like; the mixed crystals thereof; a cupric halide such as $CuCl_2$, $CuBr_2$, $CuI_2$ and the like; the mixed crystals thereof; $CuSCNCUSO_4$; $Cu(NO_3)_2$; and the like. Particularly, it is preferred that the described copper containing layer is a slow-dissolving salt dispersed layer, so as to effectively supply copper atoms to physical developing nuclei, and a cuprous halide is more preferred.

The copper compound may also be contained in a physical developing nuclei containing layer, and it may further be in the form of another dispersion layer onto a physical developing nuclei containing layer.

The cuprous halide emulsions preferably usable in this invention may be prepared in such a process as described in U.S. Ser. No. 347,647 now U.S. Pat. No. 4,433,049 and the cited reference thereof. Namely, the cuprous halide emulsions are prepared in such a process that, in an acidic aqueous solution containing a hydrophilic macromolecular compound divalent copper ions are reduced by a reducing agent.

Figure 2:
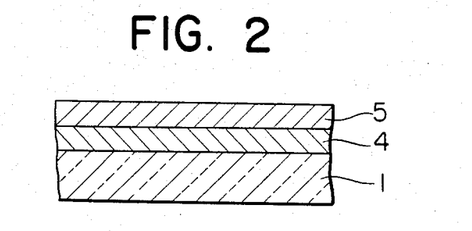
FIG. 2 is a cross-sectional view of an optical information recording medium relating to the invention, which was already physically developed.

FIG. 2 is a cross-sectional view illustrating one example of the arrangement of an optical information recording medium obtained after the described optical information recording medium precursor was physically developed. In the drawing, 4 is a recording layer in which copper was supplied thereto by a physical development to be endowed with the reflex property and the layer containing initial physical developing nuclei was changed. Even in the neighborhood of the interface on the support side of this recording layer 4, the physical development is progressed to make fine copper particles present all over the recording layer 4. 5 is a copper compound dispersed layer in which the amount of copper is decreased as the result of the physical development.

Physical development for forming the described recording layer 4 is carried out in accordance with the following mechanisms:

(1) A process in which cuprous ions or the complex ions thereof are produced with a copper compound being contained in a copper compound containing layer; and a process in which the ion species are diffused in physical developing nuclei; and (2) A process in which a metallic copper produced from cuprous ion species is grown on a physical developing nucleus.

If the copper compound in the copper compound containing layer is a cuprous compound, the process (1) is that in which the cuprous compound is dissolved in a developing liquid and is diffused therein; and if it is a cupric compound, the cupric compound is dissolved in a developing liquid and the cupric ions are changed to cuprous ions and the cuprous ions are then diffused.

The second process (2) is that in which a disproportionation reaction of cuprous ions is produced according to the following formula;

$$2Cu^+ \rightleftharpoons Cu + Cu^{2+}$$

By utilizing such a disproportionation reaction, more advantageous physical development may be attained, as compared with a process in which a metallic copper is produced by reducing copper ions. Namely, the following is a standard single electrode potential E of which the standard is the standard hydrogen electrode in a reduction reaction;

| | |
|---|---|
| $Cu^+ + e^- \rightleftharpoons Cu$ | $E = 0.520$ (V) |
| $Cu^{2+} + 2e^- \rightleftharpoons Cu$ | $E = 0.337$ (V) |

As shown above, the value of the standard single electrode potential E of copper is not high and it is therefore necessary to use a reducing agent having a substantially great reducibility to reduce copper ions through a reduction reaction. However, such a reducing agent is accompanied with a difficult problem for a practical usage.

In order to accelerate the above-mentioned disproportionation reaction, it could be good enough to make the density of cuprous ions $Cu^+$ higher and to remove cupric ions $Cu^{2+}$ to the outside of the system thereof. A cuprous halide compound is higher in solubility than a silver halide, for example, to water. It is therefore easy to maintain cuprous ions in a high density, in a developing liquid. Cupric ions may be removed by making use of a chelating agent which forms a complex upon reacting with the cupric ions.

As described above, a physical development for forming a recording layer is carried out by a disproportionation reaction of cuprous ions and is not a development made by a reduction reaction such as those in which silver is conventionally utilized. In other words, in the case of a silver halide emulsion, a physical development is carried out through the diffusion of an $Ag^+$ complex into physical developing nuclei and a reduction reaction taking place in the diffusion process. (For example, refer to T. H. James, "The Theory of the Photographic Process", chapter 16, 1966 and to Japanese Patent O.P.I. Publication No. 49296/1981). The reason is because the standard single electrode potential of silver ion is so high as is at about 0.800 (V) that the reduction may readily be carried out.

From this point of view, a developing liquid containing a compound capable of accelerating the described processes (1) and (2) is used. To be more concrete, there is preferably used a developing liquid containing a compound or a compound system having a suitable coordination power to cuprous ions and a more coordination power to cupric ions. Further, when the source of copper ions is a cupric compound, there is used a developing liquid containing a compound which is necessary for reducing cuprous ions and has a suitable reducibility.

Physical developing liquid, which is suitably usable in a physical development, is an alkaline aqueous solution containing at least one selected from those indicated in the following groups 1, 2 and 3.

Group 1: A 4-aminophenol and a 3-pyrazoline

Group 2: An amino acid derivative, aliphatic carboxylic acid, an oxycarboxylic acid, a keto-carboxylic acid, an aromatic carboxylic acid, an amine, a quinoline derivative, an amino carboxylic acid, and a pyridine derivative.

Group 3: an ascorbic acid derivative having the following formula and the alkali-metal salts thereof:

Formula wherein, R represents hydrogen or a hydroxyl radical; n is a positive integer of one to four; and the R is a hydroxyl radical provided that n is one.

If required, it is also allowed to use in combination with at least two or more kinds thereof selected from the above-mentioned three groups.

The preferably usable compounds among the 4-aminophenols classified in group 1 include 4-N-methylaminophenol . hemisulfate, i.e., the so-called metol; a 4-N-benzylaminophenol chloride; a 4-N,N-diethylaminophenol chloride; a 4-aminophenolsulfate; a 1-oxymethyl-4-aminophenol chloride; 2,4-diaminophenol, 4-N-carboxymethylaminophenol . p-oxyphenylglycine; and the like. The preferably usable compounds among the 3-pyrazoline compounds include 1-phenyl-3-pyrazolidone, 4,4-dimethyl-1-phenyl-3-pyrazolidone, 4-methyl-phenyl-3-pyrazolidone and the like.

The following examples are preferably used as the compounds included in the described second group: malonic acid, citric acid, oxalacetic acid, salicylic acid, 5-sulfosalicylic acid, α-carboxy-o-anisic acid, N,N'-di(2-hydroxyethyl)ethylenediamine, di(2-aminoethyl)ether, 2-aminomethylpyridine, 2,2-aminoethylpyridine, pyridine-2-carboxylic acid, pyridine-2,6-carboxylic acid, nicotinic acid hydrazide, isonicotinic acid hydrazide, pyridoxamine, piperidine-2,6-dicarboxylic acid, histamine, 3-methylhistamine, iminodiacetic acid, iminodipropionic acid, N-methyliminodiacetic acid, N-(3,3-dimethylbutyl)iminodiacetic acid, phenyliminodiacetic acid, hydroxyethyliminodiacetic acid, hydroxyethyliminodipropionic acid, hydroxypropyliminodiacetic acid, 2-hydroxycyclohexyliminodiacetic acid, methoxyethyliminodiacetic acid, N-(carbomoylmethyl- )iminodiacetic acid, 2-ethoxycarbonyl aminoethyliminodiacetic acid, nitrilotriacetic acid, carboxyethyliminodiacetic acid, carboxymethyliminodipropionic acid, N-n-butylethylenediamine triacetic acid, N-cyclohexylethylenediaminetriacetic acid, β-alanine, phenylalanine, telocine, phosphoserine, methionine, aspartic acid, glutamic acid, ornithine, lysine, arginine, proline, hydroxyproline, histidine, tryptophan, 1-aminocyclopentanecarboxylic acid, 1-aminocyclohexanecarboxylic acid, 1-aminocycloheptanecarboxylic acid, β-alanylhistidine, lysinevasopressin, sodium glutamate, adenosine-5-diphosphoric acid, adenosine-5-triphosphoric acid, oxine-5-sulfonic acid, quinoline-2-carboxylic acid, quinoline-8-carboxylic acid, 4-hydroxy-1,5-naphthyridine, 8-hydroxy-1,6-naphthyridine, and 8-hydroxy-1,7-naphthyridine.

Ascorbic acid derivatives having the above formula classified in the above third group and the alkali metal salts thereof include, for example, L-ascorbic acid, araboascorbic acid, I-erythroascorbic acid, α-glucoascorbic acid and the like and the alkali metal salts thereof, and inter alia, L-ascorbic acid and the alkali metal salts thereof are particularly preferred.

Solvents preferably usable in a physical developing liquid in the invention may be given such a polar solvent as pure water, an alcohol, e.g., methyl alcohol, ethyl alcohol and the like, a glycol, e.g., ethylene glycol, diethylene glycol and the like; and they may be used independently or in combination.

For the purpose of endowing the described physical developing liquid with the development characteristics such as the improvements on a developing speed, the preservability of a developing liquid and the like or with the optical characteristics such as a suitable reflectivity, absorptivity, spectral characteristics and the like, the physical developing liquid may be added, besides a developer, with various kinds of additives. Such additives mainly include, for example, alkaline agents such as hydroxides, carbonates or phosphates of an alkali metal or ammonium; pH modifiers or pH buffers such as a weak acid, e.g., acetic acid, boric acid, a weak base, or the salts thereof; and preservatives such as a sulfite, an acidic sulfite, a hydroxylamine chloride, a formaldehyde hydrogensulfite addition product, an alkanolamine hydrogensulfite addition product and the like.

The concentration of a developer in the described physical developing liquid is not specified because the concentration thereof varies according to the various kinds of the developers, however, the concentration is normally of the order of 0.01 to 2.0 mole per liter, and the developing temperature is normally from 10° to 40° C.

Desired physical development may also be performed in another process in which such a developing liquid as described is not used but a part of or the whole of the components of a developing liquid is contained in the described copper compound containing layer and then an alkali solution capable of dissolving copper compounds is made act as the above-mentioned developing liquid.

In addition, there may be allowed to utilize a solution type physical development process in which copper atoms are supplied directly to physical developing nuclei without providing any copper compound containing layer in an optical information recording medium precursor but by making use of a liquid containing copper ions for a development.

Figure 3:
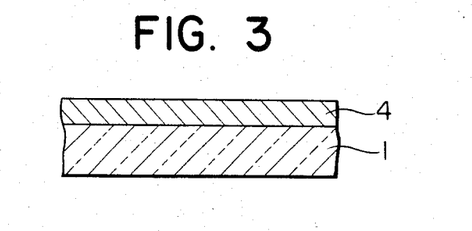
FIG. 3 is a cross-sectional view of an optical information recording medium relating to the invention, from which a copper compound containing layer was removed after it was physically developed.

Optical information recording media of the invention may also be constructed in the manner, for example, that copper compound containing layer 5 shown in FIG. 2 peeled off after a physical development process and the copper compound containing layer is removed as shown in FIG. 3. Copper compound containing layer 5 may be removed after the physical development in such a process as a peel-off process or a dissolving process. The peel-off process is performed, in a washing step after the physical development, by dissolving the hydrophilic colloid dispersion media of copper compound containing layer 5, or by raising the washing temperature up to the level of solating the dispersion media (hereinafter simply called "hot-water washing").

It is preferable to harden a recording layer 4 by making use of a hardener before a hot-water washing. Copper compound containing layer 5 is thus peeled off effectively. There is another peel-off process in which copper compound containing layer 5 is dipped in a condensed strong electrolyte aqueous solution to produce a film shrinkage, and the layer 5 is washed with hot-water to peel off the layer 5 properly. The preferred strong electrolytes usable in this case include, for example, salts of a strong acid and a strong base such as sodium sulfate. The similiar effect may be obtained also when the described strong electrolytes are contained in a physical developing liquid. The temperature in the described hot-water washing step is 20° to 50° C. and preferably 40° C.±5° C. approximately in the case, for example, that the dispersion media of a copper compound containing layer are hydrophilic colloid dispersion media and the hydrophilic colloid dispersion media are gelatin.

Thus obtained optical information recording medium is capable of displaying a high reflectivity and an excellent information recording performance, however, there are some instances where the reflectivity thereof is lowered in preservation by the oxidation of fine copper particles. For avoiding this disadvantage, it is preferred to contain a compound capable of producing a water-insoluble copper complex into a recording layer.

In the invention, a compound, i.e., a ligand, having a coordination power to copper ions is preferred to be used as the above-mentioned compound capable of producing a water-insoluble copper complex which is to be used for avoiding the oxidation deterioration of copper particles being contained in a recording layer. Namely, (1) Total stability constant K of a copper complex is substantially large,
(2) The copper complex is electrically neutral, and the so-called inner complex salt may be formed in which the coordination number of copper is satisfied, and
(3) The preferred ligands are those each having a hydrophobic functional group in the molecules thereof, such as an aryl, heterocyclic or alkyl group which does not disturb the formation of the complex.

Wherein, the total stability constant K is an equilibrium constant having the following complexing equilibrium formula:

$$Cu^{m+} + xL^{a-} \rightleftharpoons CuLx^{(m-ax)}$$

$$K = [CuLx]/[Cu][L]^x$$

Wherein, L designates a ligand.
In copper, m is 1 or 2.

When m is 2, it is preferred that the constant logarithm of a total stability constant K is not less than 5.0 at 25° C. If it is not more than 5.0, it is not preferable to put into practise, because $Cu^{2+}$ produced by a dissociation of complex produced takes part further in an oxidation reaction to cause the deterioration of a recording layer.

In this invention, the "water-insolubility" is required for preventing the inside of fine copper particles from oxidizing and deteriorating for which each complex formed on the surfaces of fine copper particles in a recording layer is endowed with hydrophobic or water-insoluble property, and the solubility thereof to water at 25° C. is generally not more than 1 g per liter.

Copper complex producible compounds capable of being suitably used in this invention are ligands each having in its coordinating donor atoms such as oxygen (O), nitrogen (N), or sulphur (S) which has a strong coordination power, and $Cu^+$ is mainly a central metal ion of linear type 2 coordination number, and $Cu^{2+}$ is mainly a central metal ion of plane square type 4 coordination number. Therefore, the desired one is a multidentate ligand in which the described donor atoms, O, N and S, may be duplicated, and a ligand has therein a plurality of the donor atoms suitably separated from each other, and a stable 5 to 6 membered chelating ring is produced, and more particularly, a didentate ligand is useful.

The useful ligands are those capable of endowing a copper complex which is stably water-insoluble and electrically neutral and cannot afford to coordinate such an aquo-ion or the like satisfying the coordination number of copper ion.

The combination of two out of the O, N and S which are allowed to be duplicated is apparently, O—O, O—N, O—S, N—N, N—S, or S—S.

The compounds preferably useful in the invention shown in the above-mentioned combination, are given below: (The exemplified compounds are numbered at the tails thereof)

(I) In combination of O—O, there are given cupferron(1); neocupferron(2); oxine-N-oxide(3); α-benzoin oxime(4); and the derivatives thereof.

(II) In combination of N—O, there are given oxine(5), the methyl derivatives thereof, the dichlor derivatives thereof and the dibrom derivatives thereof; quinoline-2-carboxylic acid(6), the constitutional isomers thereof and the derivatives thereof; salicylaldoxime(7); α-benzoinoxime(8); anthranilic acid(9); and the derivatives thereof.

(III) In combination of N—N, there are given a dioxime such as dimethylglyoxime(10); dithizone(11); and the derivatives thereof.

(IV) In combination of N—S, there are given a heterocyclic compound having a mercapto radical such as thiooxine(12); and the derivatives thereof.

(V) In combination of O—S, there are given 2-mercapto-N-2-naphthylacetamide(13); and the derivatives thereof.

(VI) In combination of S—S, there are given 2-mercaptobenzothiazole(14); 3-phenyl-S-mercapto-1,3-thiodiazole-2-thion(15); and the derivatives thereof.

(VII) Besides the above, there may also be used a chelating precipitation reagent for analysing purpose such as ethylenediamine(16); propylenediamine(17); benzidine(18); thiourea(19); hydroxynaphthaldehyde(20); thionalide(21) and the like.

In the invention, for the purpose of containing a compound for producing a water-insoluble copper complex into a recording layer, it is preferred to dip the recording layer into a solution of the described compound, i.e., a ligand, coordinating to copper ions.

This solution is generally an alkali solution of 0.1 to 0.001 M. This may also be added, if required, with such an organic substance as an alcohol, an amine or the like. The dipping time is preferred to be 0.5 to 10 minutes at room temperature.

The thickness of the recording layer of an optical information recording media of the invention is preferably 0.01 to 0.5 μm, and more preferably 0.03 to 0.2 μm. If the thickness thereof is not thicker than 0.01 μm, an irregular coating is actualized and a uniform and stable recording layer may hardly be produced. If the thickness is over 0.5 μm, the reflectivity of the recording medium is lowered and the optical reading is hardly made, and there are some instances where the signal contrast is lowered.

The average size of fine copper particles is preferably 0.005 to 0.2 μm when they are dispersed in a recording layer, and more preferably 0.01 to 0.1 μm. If the average size thereof is not larger than 0.005 μm, the absorptivity of recording energy-beam and the reflectivity of reproducing energy-beam are lowered, and there are some occasions where the recording and reproduction are almost impossible to perform. On the other hand, if the average size is not smaller than 0.2 μm, the absorptivity if lowered and the uneven reflectivity is caused by the coherence of fine copper particles, and the recording and reproducing characteristics are sometimes deteriorated.

The term, an average size, mentioned herein means the mean value of the widest and the narrowest width of fine copper particles. The particle size distribution of fine copper particles having such an average particle size is preferable to be as even in size as possible, and if the sizes of about 60% of the total fine copper particles are within ±50% of the average particle size, the distribution will suffice for the purpose.

With an optical information recording medium of the invention, an informaion read-out is necessarily carried out through a reflected light, therefore the reflectivity must be 10 to 80% and more preferably 20 to 70% to a reproduction light through a support. If the reflectivity is not greater than 10%, the S/N ratio is lowered, so that the information read-out is hard to carry out.

An optical information recording medium of the invention may also be heat-treated in the presence or non-presence of oxygen if required, for the purpose of raising the reflectivity or of thinning the film thickness. In this case, the preferable heat-treating temperature range is approximately 250° to 400° C.

Figure 4:
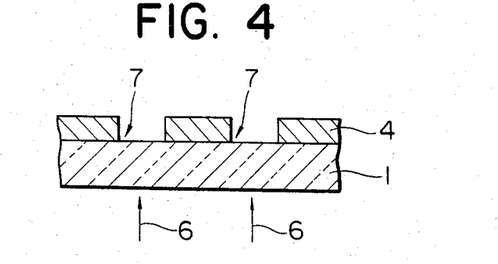
FIG. 4 is a cross-sectional view of an optical information recording medium relating to the invention to which high-density energy beams were irradiated.

FIG. 4 is a cross-sectional view showing an example of the optical information recording media onto which a pit information is registered. In this example, a high density energy-beam is irradiated from the direction of support 1 to dissolve or blow-off the irradiated area of recording layer 4 and pit 7 is thereby formed, and reference numeral 6 designates the arrows indicating the irradiation of the high density energy-beams.

According to the invention, an information may be read out and reproduced by a high density energy beam which is weaker than that for writing, upon utilizing the lowered reflectivity of the described pit 7.

The high density energy beam capable of recording a pit information used in the invention include, for example, a xenon lamp, a mercury lamp, an arc lamp, a laser beam and the like. Inter alia, the laser beam is preferred because a high density recording may be performed.

Laser beams may be used in either form of a continueous or pulse oscillation. The usable laser beams include, for example, a ruby laser of 6943 Å in wavelength; an argon-ion laser of 4880 Å, 5145 Å; a glass laser of 1.06 μm; a helium-neon laser of 6328 Å; a krypton-ion laser of 6471 Å; a helium-cadinium laser of 4416 Å, 3250 Å; a color-dye laser; a semiconductor laser; and the like.

High-density energy beams which may be used for recording on an optical information recording medium of the invention or for reproducing thereon may be of the same type or of the different. It is however preferred to irradiate through a transparent support and it may also be allowed to irradiate direct to the obverse surface side of a recording layer that is on opposite side of the transparent support.

The invention has been described above, and according to an optical information recording medium of the invention, the recording layer thereof contains fine particles mainly comprising copper being dispersed in the hydrophilic colloid dispersion media thereof, so that the layer may be reflective. Accordingly, the absorptivity of the recording layer is increased to a high-density energy beam, so that a highly effective recording may be performed, and the reflectivity is increased, so that a highly effective reading may be performed, and thus, the sensitivity and the S/N ratio may be remarkably improved. The uniformity and stability of such fine particles may be made excellent by providing the density of the particle number within a suitable range. The dispersion media of a recording layer are made of hydrophilic colloid, therefore, the recording layer may be prepared by an aqueous coating, and resultantly no organic solvent is necessarily used in a manufacturing process as it has been conventionally used, therefore, the safety may be secured in work operations. The fine particles mainly comprise copper, therefore the manufacturing cost may be lowered and, in addition, copper is less toxic so that it may be handled with safety.

In this kind of optical information recording media, the spectral characteristics of the recording layer will depend upon the double refractive index and the bulking density of fine metal particles dispersed in the form of bulk as well as the refractive index of a dispersion medium (refer to J. C. Maxwell Garnet, Philos, Trans, R. Soc., Lond., No. 203, p. 385, 1904). The determining factor thereof is the double refractive index of fine metal particles dispersed in the bulk form. In the recording media of this invention, the described fine metal particles are of copper. In the double refractive index of copper having the formula below;

$$\hat{n} = n + ik \ (i = \sqrt{-1}),$$

The values of a real number portion n and an extinction coefficient k are varied according to the wavelengths as shown in Table 1. In addition, they are also quite different from the corresponding values of silver. Consequently, it may be understood that the recording media of the invention may be applied to a wavelength light to which any conventional one has been unable to apply.

TABLE 1

| Metal | wavelength (nm) | n | k |
|---|---|---|---|
| Copper | 500 | 1.03 | 2.78 |

TABLE 1-continued

| Metal | wavelength (nm) | n | k |
|---|---|---|---|
| | 750 | 0.103 | 4.88 |
| | 3000 | 1.22 | 17.1 |
| Silver | 376 | 0.090 | 1.57 |
| | 500 | 1.0468 | 3.202 |
| | 2000 | 0.48 | 14.4 |

Figure 5:
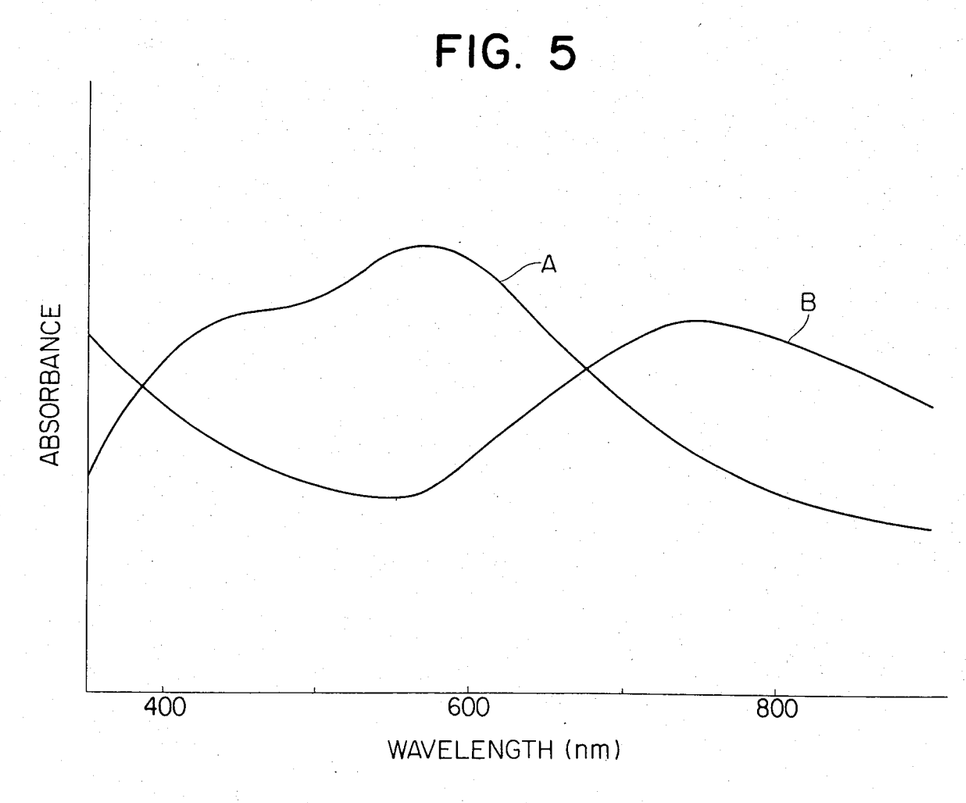
FIG. 5 is the curves showing the spectral sensitivity each when a metal of the recording layer was silver or copper.

To be concrete, a maximum spectral absorbance of recording media each having a recording layer comprising silver is in the neighborhood of about 500 to 600 nm as shown by curved line A in FIG. 5, and on the other hand, a maximum absorbance of recording media each having a recording layer comprising copper is in the neighborhood of about 700 to 800 nm. Therefore, in the latter media, it is possible to utilize a semiconductor laser normally having the oscillation wavelength in the infrared range to serve as a high energy beam for recording and reading an information, and thereby to materialize an optical information recording and reproducing means which is more compact and inexpensive than those utilizing gas-laser beams.

As for the copper compounds usable for the source of copper atoms, a copper halide is preferred, and it may be handled in the light because it is not light-sensitive, therefore it has great merits in manufacture.

The effects characterized in the invention cannot be obtained by any other techniques, such as a metal block pulverizing method, a pyrogenetic sintering method or an evaporation-depositing method, for manufacturing a thin film in which fine particles of other metal than copper are dispersed.

Hereinafter the examples of the invention will be described and it is, however, to be understood that the invention shall not be limited thereto.

EXAMPLE 1

| | |
|---|---|
| Aqueous solution of chloroauric acid of 5% by weight | 16 ml |
| Aqueous solution of sodium borohydride of 1% by weight | 40 ml |
| Aqueous solution of binder* of 1% by weight in concentration | 12 ml |
| Pure water | 430 ml |

*Binder is the mixture of gelatin of 1 part by weight and a polyvinyl alcohol derivative of 4 parts by weight.

Thus prepared material was agitated at 20° C. for 10 minutes to obtain a gold colloidal solution of which the gold concentration was 0.095% by weight, the colloid concentration was 0.025% by weight, and the average size of fine gold particles was 30 Å.

The gold colloidal solution was added with a surfactant and a hardener, and the resulting solution was coated onto a sublayered support comprising a polymethylmethacrylate plate of 1.2 mm in thickness by a spinner coating means so that the dried thickness of the coat could be 0.03 μm, and was then dried to form a nearly colorless and transparent physical developing nuclei containing layer.

On the other hand, the following composed solutions A and B were prepared:

| Solution A: | Osein gelatin | 18 g |
|---|---|---|
| | Potassium bromide | 22.4 g |
| | Potassium iodide | 0.88 g |

|  | | |
|---|---|---|
|  | L-ascorbic acid | 32.0 g |
|  | Pure water | 1200 ml |
| Solution B: | Cupric nitrate, trihydrate | 42.4 g |
|  | Pure water | 600 ml |

Solution A being kept at 40° C. and stirred was added in an instant by Solution B being kept at 40° C. The resulting mixed solution was kept stirring at 40° C. for 3 minutes, and was then desalted and washed. Thereto, 24 g of osein gelatin were added, and an ultrasonic dispersion process was applied for 10 minutes, and thus, a cuprous iodobromide of 500 ml in total were obtained. The resulting emulsion was that the pH value was 3.5, the ratio by weight of the copper contents to the gelatin contents was about 0.5, and the cuprous halide particle size was 0.05 μm which was measured by a transmission type electron microphotography.

The resulting cuprous iodobromide emulsion was coated onto the described physical developing nuclei containing layer by means of a spinner coating means so that the dried thickness of the coat could be 2.5 μm, and was dried to form a copper compound containing layer, and thus, an optical information recording medium precursor was produced.

The resulting coated layer was developed with the following developer of which the pH value 8.4 at 25° C. for 3 minutes. Then, it was washed with hot water at 37° C. so as to peel off the emulsion layer, and thus, a sample 1 was obtained.

| Developer: | |
|---|---|
| 4-amino-phenolsulfate | 0.085 mole |
| L-ascorbic acid | 0.2 mole |
| Sodium metaborate | 0.026 mole |
| Add pure water to make 1000 ml in total. | |

When observing this sample through the support made of a polymethylmethacrylate plate, it was found that a metallic luster copper mirror was produced thereon, and the reflectivity thereof was at 40% when irradiating a light of 830 nm in wavelength. The thickness of the recording layer was 0.08 μm; the average particle size of fine copper particles in the recording layer was 0.04 μm; and the density of the particle number was $2 \times 10^{16}$ particles per $cm^3$.

The above-mentioned sample was rotated upon setting on a turn table to scan it at the scanning speed of 10 m/sec with semiconductor laser beam of 830 nm in wavelength condensed to 1.4 μm in the beam diameter, and pits were formed on the recording layer by giving a pulse signal of 1 MHz (500 nsec in the pulse width), and thus, a writing was tried.

The intensity of the laser beam scanned on the recording layer of the sample was 10 mW at the time of recording and 2 mW at the time of reproduction. When the S/N ratio of recording and reproduction was measured in the bandwidth of 30 KHz, it was 45 dB.

EXAMPLE 2

The sample 1 in Example 1 was dipped for 3 minutes in an alkali solution (containing 40 vol. % of methanol) of the following 0.01 M compounds, i.e., the ligands, selected according to the described standard, and was then washed for ten minutes and dried by air. The samples 2 through 6 were thus prepared.

Each of the sample was preserved at 50° C. and 80 RH % for one month to put to the torture test. The change of the reflectivity (830 nm) was resulted in Table 1.

Preservation stability improvement was attained and recording reproduction characteristics were not affected at all.

TABLE 1

| Sample No. | Reflectivity (830 nm) Compound | *Reflectivity |
|---|---|---|
| 1 | Untreated | 27 |
| 2 | benzothiazole-SH derivative | 39 |
| 3 | triazole-SH phenyl derivative | 40 |
| 4 | thiadiazole KS/phenyl derivative | 38 |
| 5 | 8-hydroxyquinoline | 36 |
| 6 | quinoline-2-carboxylic acid | 38 |

*Reflectivity of New Samples: 40%

Each of the samples 1 and 2 was investigated, after the preservation, about the S/N ratio of recording and reproduction. The results were that the dB value of sample 2 remained almost unchanged and that of sample 1 was lowered to 32 dB.

(COMPARATIVE EXAMPLE)

A thin film recording layer of tellurium having a thickness of 300 Å was preserved at 50° C. and 80 RH % for one week to put to the torture test. The reflectivity of 40% before the preservation was changed to 14% after the preservation. The intensity of the laser beam scanned on the recording layer was 10 mW at the time of recording and the S/N ratio of recording and reproduction in the laser power of 0.8 mW was less than 20 dB.

What is claimed is:

1. An optical information recording medium for recording and reproducing information by way of applying high density energy beams to a reflective recording layer on a support, wherein said reflective recording layer comprises a hydrophilic colloid; a compound capable of producing a water-insoluble copper complex; and reflective fine particles consisting essentially of copper.

2. The optical information recording medium as claimed in claim 1, wherein said hydrophilic colloid is an acrylic acid resin, a water-soluble cellulose derivative, or gelatin.

3. The optical information recording medium as claimed in claim 1, wherein an average size of said reflective fine particles is from 0.005 $\mu$m to 0.2 $\mu$m.

4. The optical information recording medium as claimed in claim 1, wherein the density of said reflective fine particles is from $1 \times 10^{15}/cm^3$ to $1 \times 10^{18}/cm^3$.

5. The optical information recording medium as claimed in claim 1, wherein said compound capable of producing a water-insoluble copper complex is a didentate ligand in which a plurality of the doner atoms of O, N or S is allowed to be duplicated each other in said ligand.

6. The optical information recording medium as claimed in claim 5, wherein said ligand has at least one hydrophobic functional group selected from the group consisting of an aryl group, a heterocyclic group and an alkyl group in the molecule thereof.

7. The optical information recording medium as claimed in claim 1, wherein said recording layer has a thickness of 0.01 to 0.5 $\mu$m.

8. The optical information recording medium as claimed in claim 1, wherein said support is substantially transparent to the high density energy beams.

9. A process for manufacturing an optical information recording medium for writing and reading information by way of applying high density energy beams to a reflective recording layer on a support, which comprises the steps of: providing a physical developing nuclei containing layer on a support; physically developing a copper compound in the presence of said physical developing nuclei to obtain said reflective recording layer; and adding a compound capable of producing a water-insoluble copper complex.

10. The process for manufacturing an optical information recording medium as claimed in claim 9, wherein said physical developing nuclei layer further comprises a hydrophilic colloid.

11. The process for manufacturing an optical information recording medium as claimed in claim 9, which further comprises providing a hydrophilic colloid layer on said physical developing nuclei containing layer.

12. The process for manufacturing an optical information recording medium as claimed in claim 9, wherein said copper compound is present in a layer on said physical developing nuclei containing layer.

13. The process for manufacturing an optical information recording medium as claimed in claim 12, wherein said copper compound is a cuprous halide.

14. The process for manufacturing an optical information recording medium as claimed in claim 9, wherein said physical developing nuclei has a size of 0.002 to 0.2 $\mu$m.

15. The process for manufacturing an optical information recording medium as claimed in claim 9, wherein said physical developing nuclei containing layer has a thickness of 0.01 to 0.5 $\mu$m.

16. The process for manufacturing an optical information recording medium as claimed in claim 10, wherein said hydrophilic colloid is an acrylic acid resin, a water-soluble cellulose derivative, or gelatin.

* * * * *